June 9, 1959 A. C. STOVER 2,890,063
HYDRAULIC SUSPENSION AND STABILIZER SYSTEMS FOR VEHICLES
Filed Nov. 9, 1953 3 Sheets-Sheet 1
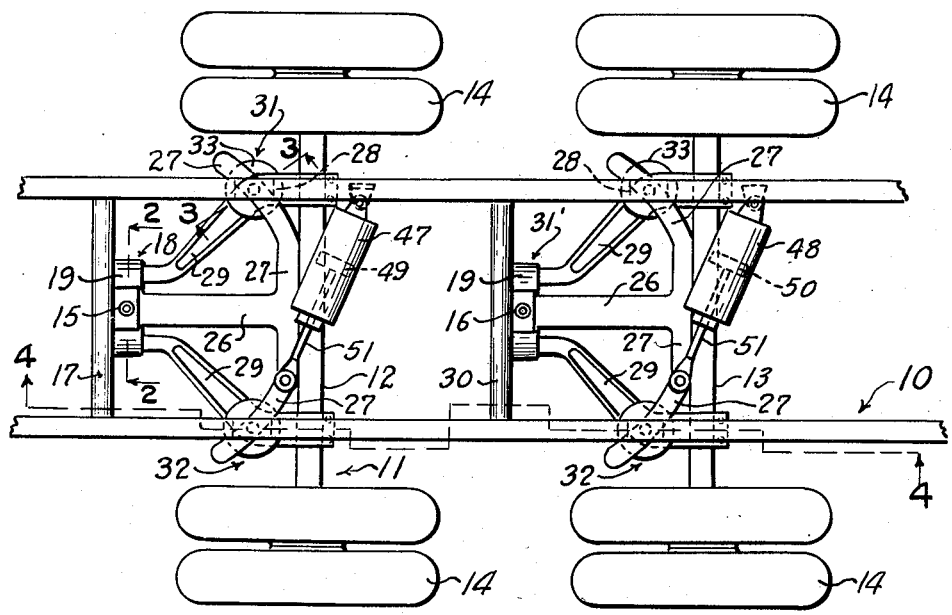
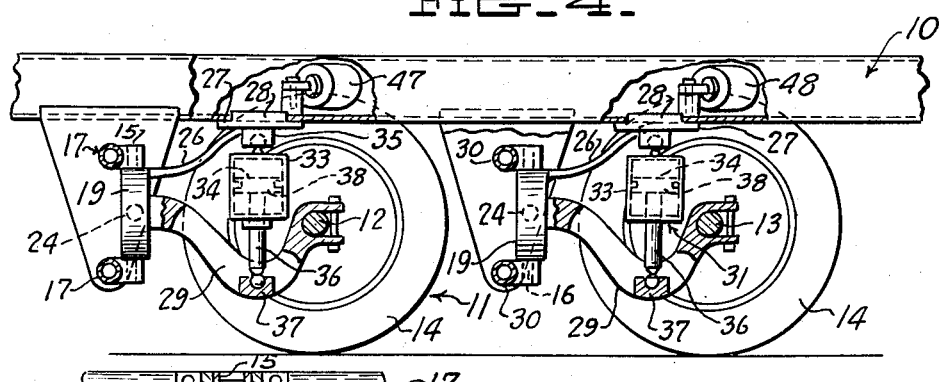
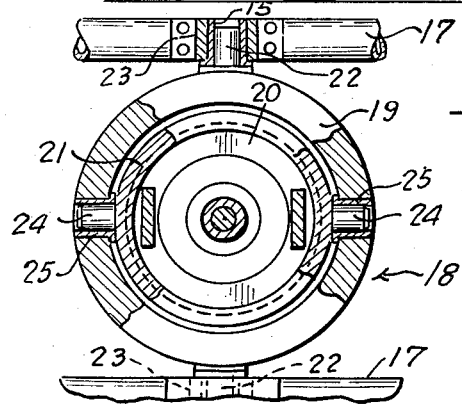
INVENTOR.
Ancil C. Stover
BY
Whittemore, Hulbert & Belknap
ATTORNEYS

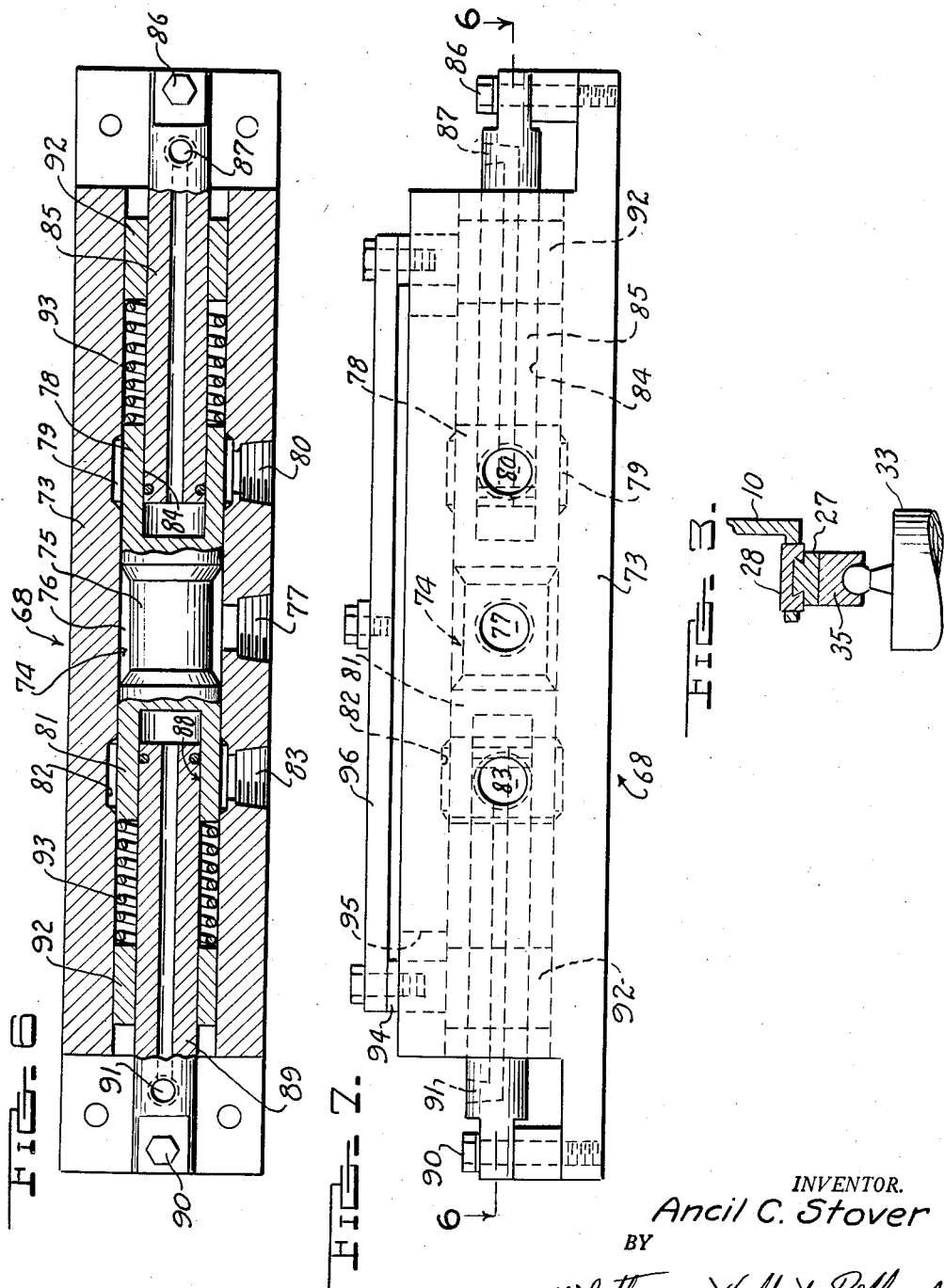

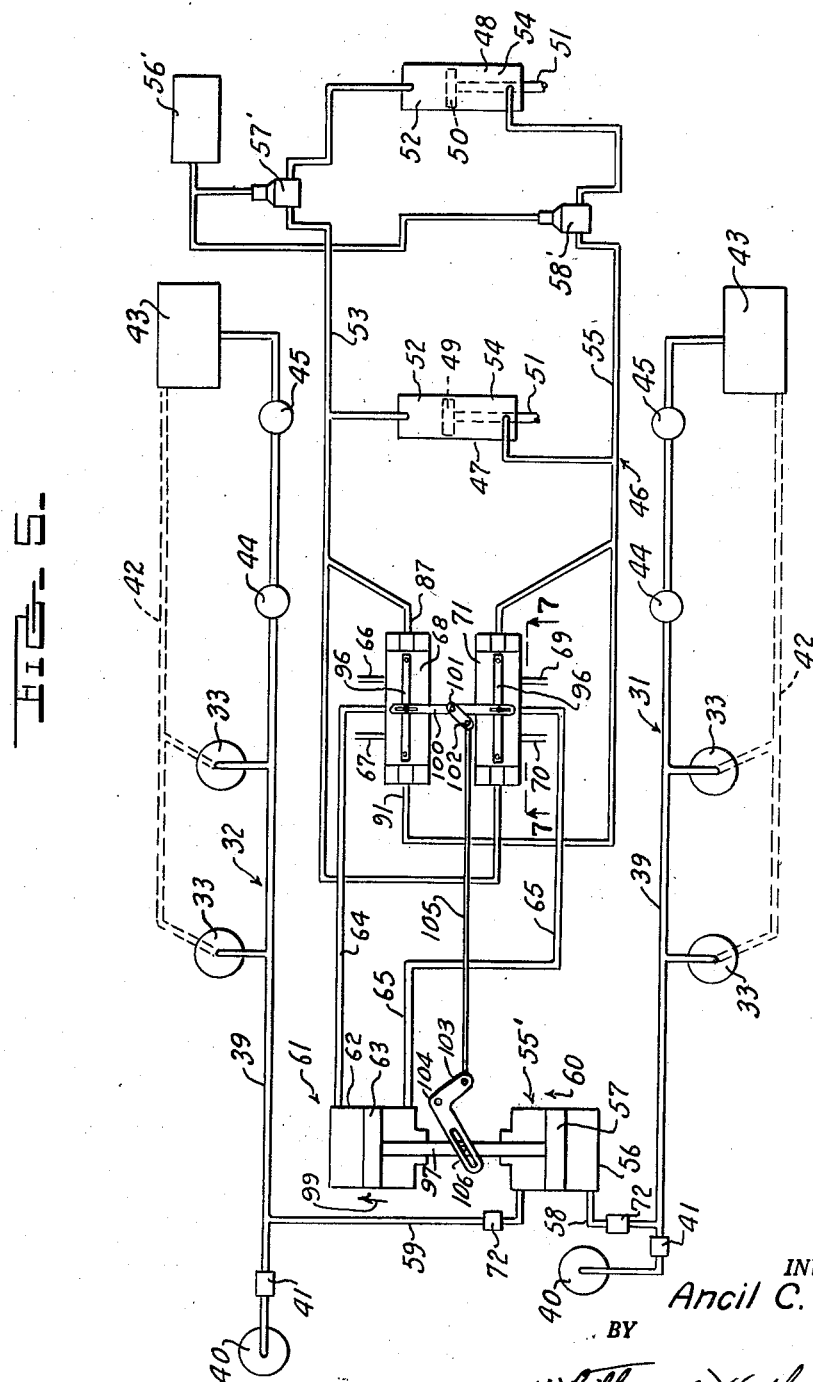

United States Patent Office 2,890,063
Patented June 9, 1959

2,890,063

HYDRAULIC SUSPENSION AND STABILIZER SYSTEMS FOR VEHICLES

Ancil C. Stover, Louisville, Ky., assignor to William A. Eisenhauer, William P. Ellwood, Ida J. Eisenhauer, and Leigh E. Eisenhauer, co-partners doing business under the firm name of The Eisenhauer Manufacturing Company, Van Wert, Ohio Application November 9, 1953, Serial No. 390,896

24 Claims. (Cl. 280—109)

This invention relates to improvements in vehicle suspension and directional stabilizing systems.

More particularly, the present invention concerns itself with vehicles of substantial length having tandemly arranged load carrying axles respectively supported for turning movement about substantially vertically extending axes located with respect to the axles to provide the caster effect required to enable the axles to turn in their appropriate directions throughout substantially equal angular paths as the course of the vehicle is changed by manipulation of the steering wheels. While such an arrangement is highly advantageous in multi-axle vehicles in order to obtain the desired maneuverability, nevertheless, it presents a serious problem in maintaining stability throughout all types of driving conditions. For example, the centrifugal force resulting from changing the course of the vehicle while the latter is traveling at relatively high speed could exceed the normal steering forces acting on the load carrying axles sufficiently to impart substantial lateral thrusts on the ground engaging wheels carried by the axles and cause the latter to turn in the same direction toward the outside of the curve being negotiated by the vehicle. Thus, if the speed of the vehicle were high enough or the curve sharp enough, the rear end of the vehicle would have a tendency to run off the road surface toward the outside of the curve.

In order to overcome the above objection and at the same time assure proper turning movement of the load carrying axles regardless of lateral forces that may be applied to these axles through the ground engaging wheels thereon, it has been proposed to connect the turning axles with a hydraulic stabilizing system of the general type disclosed in Patent 2,643,895 dated June 30, 1953. This stabilizing system provides a relatively non-compressible fluid connection between the turning axles which includes fluid displacement devices arranged to assure directional stability of the turning axles regardless of external forces that may be applied to either or both axles through the ground engaging wheels on said axles.

Although the above arrangement has proved highly effective in improving the directional stability of multi-axle vehicles of the above type, regardless of road conditions, nevertheless, it is an object of this invention to further improve the directional stability of such vehicles by providing means operated by differences in fluid pressure in opposite sides of the hydraulic stabilizing system for raising one side of the sprung weight assembly of the vehicle and correspondingly lowering the other side in a manner such that the center of gravity of the load is in effect shifted in a direction to oppose the direction of the lateral thrust responsible for the differential pressure condition in the stabilizer system. For example, when the vehicle has negotiated a sharp curve or is propelled along a road surface inclined in a direction transverse to the path of the vehicle, a centrifugal force is created which is applied in the form of a lateral thrust to the load and ground engaging wheels on the turning axles. Such a thrust will result in creating a difference in pressure in the hydraulic stabilizing system and according to this invention this pressure difference is utilized to shift the load center in opposition to the lateral forces by raising the appropriate side of the sprung weight assembly of the vehicle and lowering the other side of the latter assembly.

It is another object of this invention to provide a vehicle possessing the above features and having a sprung assembly mounted on the unsprung assembly by hydraulic suspension systems respectively located at opposite sides of the vehicle.

It is a further object of this invention to provide means for introducing fluid into the suspension system at one side of the vehicle and withdrawing a corresponding amount of fluid from the suspension system at the opposite side of the vehicle in response to a differential pressure in opposite sides of the hydraulic stabilizing system caused by the application of lateral thrusts on the turning axles.

The foregoing as well as other objects will be made more apparent as this description proceeds especially when considered in connection with he accompanying drawings, wherein:

Figure 1 is a fragmentary semi-diagrammatic plan view of a vehicle embodying the features of this invention;

Figure 2 is an enlarged sectional view taken on the line 2—2 of Figure 1;

Figure 3 is a sectional view taken on the line 3—3 of Figure 1;

Figure 4 is a sectional view taken on the line 4—4 of Figure 1;

Figure 5 is a diagrammatic view of the hydraulic suspension and stabilizer systems embodied in the vehicle shown in Figure 1;

Figure 6 is a sectional view taken on the line 6—6 of Figure 7; and

Figure 7 is a side elevational view of the construction shown in Figure 6.

As noted above, the present invention is particularly adaptable to motor vehicles of considerable length and capable of carrying extremely heavy loads. A part of such a vehicle is shown in Figures 1 and 4 of the drawings, although it is to be understood that many of the features of this invention are adaptable to other types of vehicles.

The vehicle shown in the drawings comprises a sprung weight assembly in the form of a frame 10, and an unsprung weight assembly 11. The unsprung weight assembly 11 is shown in the present instance as having two tandemly arranged load carrying axles 12 and 13, although it will be understood as this description proceeds that additional load carrying axles may be provided if desired. In any case, each load carrying axle has ground engaging wheels 14 respectively supported on opposite ends thereof in the usual manner. It is to be further understood that the vehicle is equipped with steering wheels supported at the front end thereof in the usual manner to enable changing the course of travel of the vehicle to suit existing conditions. The steering wheels and operating mechanism therefor are not shown herein as they may be of any one of the various orthodox designs.

It will be apparent from the following description that the load carrying axles 12 and 13 are respectively supported for turning movement about substantially vertically extending axes 15 and 16 spaced equal distances forwardly from the respective axles midway between opposite ends of the latter to provide both axles with a caster effect. In other words, the axes about which the axles turn are so arranged that when the course of travel of the vehicle is changed by manipulation of the usual front steering wheels, the axles will turn in their appropriate directions throughout the required angle to conform the path of travel of the ground engaging wheels 14 to the steering pattern established by the direction of forward motion of the front end of the vehicle. It is important to note that the axles 12 and 13 are turned about their respective axes solely by the resultant lateral thrust developed at the points of ground engagement of the wheels 14.

With the above in view, reference is made more in detail to Figure 2 of the drawings showing the manner in which the front axle 12 is mounted on the frame 10. In detail, the reference numeral 17 indicates a cross member secured to the frame 10 in spaced relation to the axle 12 at the front side of the latter and the numeral 18 indicates the mounting for the axle 12 on the cross member 17. The mounting 18 comprises an outer ring 19, an inner ring 20, and an intermediate ring 21. The three rings are arranged in concentric relationship and are supported with their centers lying in substantially a common vertical plane with the longitudinal center line of the vehicle frame 10. The outer ring 19 is equipped with diametrically opposed vertically aligned trunnions 22 which establish the axis 15 of turning movement of the axle 12 and are journalled in bearings 23 supported by the cross member 17. The intermediate ring 21 has diametrically opposed horizontally aligned trunnions 24 which are respectively journaled in bearings 25 carried by the outer ring 19. The inner ring 20 is supported on the intermediate ring 21 for rotation about the axes of the rings.

The outer ring 19 has a suspension element 26 secured to the top thereof and projecting rearwardly toward the axle 12. The rear end of the element 26 is fashioned with laterally outwardly extending parts 27 having the outer ends respectively positioned below the opposite side rails of the frame 10. The outer extremities of the parts 27 are curved in concentric relationship to the axis 15 and are slidably supported on the frame 10 by guides 28, as shown in Figure 3 of the drawings.

The inner rotatable ring 20 is connected to the axle 12 adjacent opposite end portions of the latter by a pair of arms 29. The arms 29 project rearwardly from diametrically opposite sides of the inner ring 20 and are secured at the rear ends to the axle 12. Inasmuch as the inner ring 20 is rotatable about its axis relative to the rings 19 and 21, it follows that the axle 12 may tilt freely in a vertical plane to conform to uneven road conditions. Also, since the intermediate ring 21 is free to pivot about a horizontal axis, it follows that the axle 12 may also be moved in an up and down direction relative to the frame 10. Moreover, since the trunnions 22 allow pivotal movement of the outer ring 19 about the vertical axis 15, it follows that the axle 12 may turn freely about this axis.

In the present instance the axle 13 is supported on a second cross member 30 of the frame 10 by a mounting 31'. The mounting 31' is identical to the mounting 18 and corresponding parts are designated by the same reference numerals. Thus, both axles 12 and 13 have the freedom of movement relative to the frame 10 required to not only provide optimum riding characteristics under practically all road conditions but in addition to enable the axles to conform to the steering pattern of the vehicle when the course of travel of the latter is changed.

In the present instance, the sprung weight assembly is supported hydraulically on the unsprung weight assembly and for accomplishing this result two hydraulic suspension systems 31 and 32 are provided at opposite sides of the vehicle. The hydraulic suspension system 31 at one side of the vehicle comprises a pair of vertically extending cylinders 33 and pistons 34 respectively slidably mounted in the cylinders 33. As shown particularly in Figure 4 of the drawings, the upper ends of the cylinders 33 are respectively mounted on the adjacent parts 27 of the mountings 18 and 31' by universal couplings 35 so that the cylinders may have in effect a pivotal movement in all directions relative to the respective mountings. The pistons 34 in the respective cylinders 33 have connecting rods 36 which extend downwardly through the bottom walls of the cylinders 33 and are respectively mounted on the adjacent arms 29 of the mountings 18 and 31' by universal couplings 37. As a result, the pistons 34 may assume the same relative positions as the cylinders 33 without any danger of binding of the parts.

The variable volume spaces in the cylinder 33 above the pistons 34 are sealed from the variable volume spaces in the cylinder 33 below the pistons 34 by annular seals 38 carried by the respective pistons and engageable with the inner surfaces of the cylinders. The variable volume spaces in the cylinders 33 above the pistons 34 are connected together by a fluid line 39 which in turn is connected to a source of fluid under pressure 40 through the medium of a check valve controlled by-pass 41. The source of fluid under pressure 40 may be in the form of a hydraulic accumulator having provision for supplying a relatively non-compressible fluid to the variable volume spaces in the cylinders 33 above the pistons 34.

The variable volume spaces in the cylinders 33 below the pistons 34 are connected together by a fluid conduit 42 which in turn is connected to a reservoir 43 below the level of the fluid therein. The reservoir 43 is preferably of the type wherein the fluid contained therein is under atmospheric pressure, although a pressurized reservoir may be used if desired.

The conduit 39 is also shown in Figure 5 of the drawings as connected to the reservoir 43 through a shut-off valve 44 and a pump 45. The purpose of this arrangement is to permit replenishing the variable volume spaces in the cylinders 33 above the pistons 34 with fluid from the reservoir to compensate for leakage of fluid past the piston seals 38.

The hydraulic suspension system 32 at the opposite side of the vehicle is identical to the system 31 previously described and the same reference numerals are used to designate corresponding parts. It follows from the above that the sprung weight assembly of the vehicle is supported by vertical columns of a non-compressible fluid contained in the variable volume spaces in the cylinders 33 of both systems above the pistons 34 in the respective cylinders.

It has previously been stated that the load carrying axles are mounted to enable these axles to turn in the appropriate directions and throughout the required angle to enable the ground engaging wheels to conform to the steering pattern of the vehicle. It has also been stated that the axles are turned about their respective axes 15 and 16 by a lateral thrust imparted to the ground engaging wheels as a result of changing the course of travel of the vehicle by manipulating the steering wheels. While this arrangement greatly improves the maneuverability of the vehicle, nevertheless, it also tends to detract from the stability of the vehicle under certain conditions of operation. For example, the centrifugal force which naturally results when the forward motion of the vehicle is changed in one direction or the other, also imparts a lateral thrust upon the ground engaging wheels which could greatly exceed the normal steering forces. The reaction of such centrifugal forces tends to cause both the load carrying axles to turn in the same direction or, in other words, to turn toward the outside of the curve being negotiated by the vehicle. If the external forces opposing the normal steering forces are great enough it is possible that the rear end of the vehicle would actually run off the road surface at the outside of the curve. In any case, directional stability of the vehicle would be grossly impaired.

In order to overcome the foregoing objection and at the same time enable the ground engaging wheels on the load carrying axles to conform to the steering pattern of the vehicle, a hydraulic stabilizing system 46 is provided. The system 46 comprises a pair of double acting hydraulic cylinders 47 and 48 respectively having pistons 49 and 50 slidably supported therein. As shown in Figure 1 of the drawings, one end of the cylinder 47 is pivoted on the frame 10 adjacent the axle 12 and the corresponding end of the cylinder 48 is pivoted on the frame 10 adjacent the axle 13. The pistons have connecting rods 51 which respectively extend through the opposite ends of the cylinders and are respectively pivotally connected to the suspension members 26 of the mountings 18 and 31'. The arrangement is such that the pistons 49 and 50 are moved relative to the cylinders 47 and 48 in response to turning movement of the axles 12 and 13.

As shown in Figure 5 of the drawings the variable volume spaces 52 at one side of the pistons in the stabilizer cylinders are connected together by a fluid conduit 53 and the variable volume spaces 54 at the opposite sides of the pistons in the suspension cylinders are connected together by the conduit 55. The conduit 53 is also connected to a pressurized reservoir 56' through the medium of an aspirating valve 57' and the conduit 55 is connected to the same reservoir 56' through the medium of a second aspirating valve 58'. The reservoir 56' and aspirating valves 57' and 58' are shown in detail in my copending application, Serial No. 327,231 filed Dec. 22, 1952, and which issued into Patent No. 2,761,693 on September 4, 1956. The stabilizing cylinders as well as the fluid connections therebetween are filled with a relatively non-compressible fluid medium and air pockets are eliminated from the systems by the aspirating valves. Thus, turning movement of the axles caused by normal steering thrusts imparted to the road engaging wheels on the axles when the course of travel of the vehicle is changed causes a displacement of the hydraulic fluid medium in the stabilizing system so that the axles may turn in the appropriate directions and throughout the angle required for the axles to follow the steering pattern of the vehicle. However, it is clear that the stabilizing system would resist any external force opposing the normal steering thrusts and tending to turn the axles in the same direction, for example. Such opposing forces would produce a difference in pressure in opposite sides of the stabilizing system and this difference in pressure is employed herein for the purpose of shifting the center of gravity of the load on the vehicle to compensate for the effect of the centrifugal force resulting from turning the vehicle at relatively high speeds.

With the above in view, reference is again made to Figure 5 of the drawings wherein it will be noted that the reference numeral 55' designates a control device comprising a cylinder 56 and a piston 57 slidably supported in the cylinder 56. The variable volume space in the cylinder 56 at one side of the piston 57 is connected by a conduit 58 to the supply conduit 39 of the suspension system 31, and the variable volume space at the opposite side of the piston 57 in the cylinder 56 is connected by a conduit 59 to the supply conduit 39 of the suspension system 32. The variable volume spaces in the cylinder 56 are filled with a relatively non-compressible hydraulic fluid medium so that movement of the piston 57 in the direction of the arrow 60 introduces a volume of fluid into the upper ends of the cylinders 33 of the suspension system 32 and withdraws fluid from the upper ends of the cylinders 33 of the suspension system 31. Thus, the side of the frame 10 at which the suspension system 32 is located is raised and the opposite side of the frame is lowered. Of course, movement of the piston 57 in the control cylinder 56 in the opposite direction reverses the above operation so that the side of the frame at which the suspension 31 is located is raised and the opposite side of the frame is correspondingly lowered.

The piston 57 in the control cylinder 56 is operated by a power device 61 comprising a double acting cylinder 62 and a piston 63 slidably supported in the cylinder. The space in the cylinder 62 at one side of the piston 63 is connected to a conduit 64 and the space in the cylinder 62 at the opposite side of the piston 63 is connected to a conduit 65. The conduit 64 is alternately connected to a source of fluid under pressure 66 and an exhaust 67 through the medium of a valve 68. The conduit 65 is alternately connected to a source of fluid under pressure 69 and an exhaust 70 through a valve 71. As will be presently set forth, the valves 68 and 71 are operated by differences in pressure in opposite sides of the hydraulic stabilizing system 46. Thus, when a differential pressure exists in opposite sides of the stabilizing system 46, the power piston 63 is operated by fluid under pressure to in turn actuate the control device 55'. The fluid under pressure employed to actuate the power piston 63 is preferably pneumatic and may be supplied from any suitable source.

As shown in Figure 5 of the drawings, a pressure sensitive shut off valve 72 is located in each of the conduits 58 and 59. The purpose of these valves is to close the hydraulic suspension systems whenever the fluid pressure in the power device 61 drops below a predetermined value. In addition, the valves 72 provide a variable flow control from one suspension system to the other so that the reaction to the pressure differential in the stabilizing system will not be too rapid and cause "hunting" of the system.

The valves 68 and 71 are identical in construction and the valve 68 is shown in detail in Figures 6 and 7 of the drawings. The valve 68 comprises an elongated casing 73 and a spool 74 slidably mounted in the casing intermediate the ends thereof. The central portion 75 of the spool 74 is reduced in diameter to provide an annular space 76 within the casing and this space communicates with a port 77 which in turn communicates with the conduit 64. The interior of the casing 73 is enlarged opposite the end 78 of the spool to provide an annular space 79 which communicates with the source of fluid under pressure 66 through a port 80. Also, the interior of the casing 73 is enlarged opposite the other end 81 of the spool 74 to provide an annular space 82 which communicates with a port 83 connected to the exhaust 67.

The end 78 of the spool 74 has an axially extending bore 84 for slidably receiving a tubular member 85 having the outer end projecting beyond the adjacent end of the valve casing and secured thereto by a fastener element 86. An intake port 87 is formed in the outer end portion of the tube 85 and is connected to the conduit 53 of the stabilizing system 46.

The opposite end 81 of the spool 74 is formed with an axially extending bore 88 for slidably receiving the inner end of a tube 89 having the outer end projecting beyond the corresponding end of the valve casing 73 and secured thereto by a fastener 90. An intake port 91 is formed in the outer end portion of the tube 89 and is connected to the conduit 55 forming the opposite side of the stabilizing system 46.

Slidably mounted on each sleeve within the valve casing 73 is a sleeve 92. The sleeves 92 are respectively spaced axially from opposite ends of the spool 74 by coil springs 93 respectively surrounding the tubes between the sleeves 92 and adjacent ends of the spool 74. As shown in Figure 7 of the drawings, the sleeves 92 have projections 94 which extend through slots 95 formed in the valve casing and are connected together by linkage 96. The linkage 96 is also connected to a rod 97 which connects the power piston 63 to the control piston 57 in a manner to be more fully hereinafter described. The valve 71 is identical in construction to the valve 68 previously described and the same reference numerals are used to designate corresponding parts. The intake port 87 of the valve 71, however, is connected to the conduit 55 of the hydraulic suspension system 46, and the intake port 91 of the valve 71 is connected to the conduit 53 of the hydraulic suspension system 46. Also, the port 77 in the valve casing 73 of the valve 71 is connected to the conduit 65 and the linkage 96 interconnecting the sleeves 92 of the latter valve is also connected to the rod 97 for reasons to be presently described.

It follows from the above that when the pressure in the conduit or side 53 of the hydraulic stabilizing system 46 becomes greater than the pressure in the opposite side or conduit 55 of this stabilizing system, fluid under pressure enters the intake port 87 in the valve 68 and flows through the tube 85 into the bore 84 at the end 78 of the spool 74. Since the intake port 91 of the valve 68 is connected to the side 55 of the stabilizing system 46 wherein the pressure is somewhat lower, it follows that the spool 74 of the valve 68 is moved to the left as viewed in Figure 6 against the action of the spring 93 adjacent the end 81 of the spool 74 to connect the exhaust port 83 of the valve 68 to the port 77. Thus, the conduit 64 connected to the power cylinder 62 is exhausted. At the same time fluid under pressure from the conduit 53 of the stabilizing system 46 is introduced into the intake port 91 of the valve 71 causing the spool 74 in the latter valve to move in the opposite direction against the action of the spring 93 adjacent the end 78 of the spool 74. As a result the source of fluid under pressure 69 is connected to the port 77 of the valve 71 and fluid under pressure flows through the conduit 65 into the end of the power cylinder 62 opposite the end connected to the exhaust by the conduit 64. Thus, the piston 63 in the power cylinder 62 is moved in the direction of the arrow 99 (Figure 5) and the control device 55' is operated to introduce fluid into the upper ends of the cylinders 33 of the suspension system 32 and withdraw a corresponding volume of fluid from the upper ends of the cylinders 33 of the suspension system 31.

It is apparent from the foregoing that when the pressure in the side or conduit 55 of the stabilizing system 46 becomes greater than the pressure in the opposite side or conduit 53, the valves will operate to reverse the action of the power device 61 and control device 55'. In other words, when this latter condition exists hydraulic fluid medium is displaced into the upper ends of the cylinders 33 of the suspension system 31 and is withdrawn from the upper ends of the cylinders 33 of the suspension system 32.

It has previously been stated that the sleeves 92 of each valve are connected together and to the actuating rod 97 for the control device 55'. In this connection attention is again directed to Figure 5 of the drawings wherein it will be noted that a link 100 is secured intermediate the ends thereof to a shaft 101 which is suitably supported for rotation and has a lever 102 secured thereto. The opposite ends of the link 100 are respectively pivotally connected to the linkage 96 associated with the respective valves 68 and 71. The free end of the lever 102 is connected to one arm 103 of a bell crank 104 by a link 105 and the other arm 106 of the bell crank is connected to the piston rod 97. The arrangement is such that when the valve spools 74 are moved in either direction from their neutral positions against the action of the coil springs 93 to effect movement of the piston 57 in the control cylinder 56, the sleeves 92 and the coil springs 93 are moved as a unit by the piston rod 97 in the appropriate directions to maintain the valve spools in their operative positions. Also, with the above construction, it will be noted that when the suspension systems at opposite sides of the vehicle are again restored to equilibrium as a result of return of the stabilizing system to a condition where the pressures in opposite sides thereof are substantially the same, the valve spools 74 and associated parts are restored to their neutral positions by the piston rod 97.

Referring more in detail to the functioning of the valves 68 and 71, the sleeves 92 and the coil springs 93 are moved as a unit by the piston rod 97 in a direction opposite the direction of movement of the spools 74. Thus, a progressive relationship is established between the external forces applied laterally against the ground engaging wheels and the range or magnitude of the ensuing movement resulting from the transfer of fluid from the suspension on one side of the vehicle to the suspension on the other side of the vehicle. In other words, the lateral forces applied to the ground engaging wheels tending to produce differences in pressure in opposite sides of the hydraulic systems are counteracted by substantially equal forces in order to obtain a condition of balance. It is to be further noted that the opposing forces previously described have their counterparts in the form of opposing forces within the respective valves 68 and 71. In other words, the fluid pressure within the valves opposes the spring pressure which is modified by movement of the sleeves 92 and the coil springs 93 through the mechanical linkage which connects the piston rod 97 to the links 96 of the respective valves. When the forces within the valves 68 and 71 become out of balance, movement of the piston rod 97 results. However, the mechanical linkage connecting the piston rod 97 to the valve sleeves 92 is so adjusted that a balancing of forces within the valves 68 and 71 causes the valve spools to assume their neutral position with the respective valve bodies.

What I claim as my invention is:

1. In a vehicle comprising a supported assembly and a supporting assembly having tandemly arranged axles equipped with ground engaging wheels and supported for turning movement about substantially vertically extending axes located to provide the axles with a caster effect, a suspension system for supporting the supported assembly on the supporting assembly, a directional stabilizing system interconnecting the axles and having parts relatively movable to enable turning movement of the axles in the appropriate directions to allow said axles to conform to changes in the course of travel of the vehicle, said stabilizing system also having provision for resisting relative movement of said parts in response to the application of external lateral thrusts on the ground engaging wheels other than the natural steering thrusts imparted to the wheels as a result of a change in the course of travel of the vehicle, and means operated by the stabilizing system in response to the reaction of the aforesaid lateral thrusts imparted to said relatively movable parts for raising one side of the supported assembly and correspondingly lowering the other side of said supported assembly.

2. In a vehicle comprising a supported assembly and a supporting assembly having tandemly arranged axles equipped with ground engaging wheels and supported for turning movement about substantially vertically extending axes located with respect to the axles to provide the latter with a caster effect, a first hydraulic suspension system for one side of the supported assembly, a second hydraulic suspension system for the other side of the supported assembly, each suspension system comprising a displacement device having a vertically extending cylinder connected to one of the assemblies and having a piston in the cylinder connected to the other of the assemblies, power means in each suspension system for respectively supplying fluid under pressure to the cylinders at one side of the pistons therein to support the supported assembly, a directional stabilizing system interconnecting the axles and having parts relatively movable to enable turning movement of the axles in the appropriate directions to allow said axles to conform to changes in the course of travel of the vehicle, said stabilizing system also having provision for resisting relative movement of the parts in response to the application of external lateral thrusts on the ground engaging wheels other than the natural steering thrusts imparted to the wheels as a result of a change in the course of travel of the vehicle, and means operated by the stabilizing system in response to the reaction of external lateral thrusts applied to said parts for introducing fluid into one cylinder at said one side of the piston therein and for withdrawing a corresponding volume of fluid from the other cylinder at said one side of the piston therein.

3. In a vehicle comprising a supported assembly and a supporting assembly having tandemly arranged axles equipped with ground engaging wheels and supported for turning movement about substantially vertically extending axes located with respect to the axles to provide the latter with a caster effect, a first hydraulic suspension system for one side of the supported assembly, a second hydraulic suspension system for the other side of the supported assembly, each suspension system comprising a displacement device having a vertically extending cylinder connected to one of the assemblies and having a piston in the cylinder connected to the other of the assemblies, power means in each suspension system for respectively supplying fluid under pressure to the cylinders at one side of the pistons therein to support the supported assembly, a directional stabilizing system interconnecting the axles and having parts relatively movable to enable turning movement of the axles in the appropriate directions to allow said axles to conform to changes in the course of travel of the vehicle, said stabilizing system also having provision for resisting relative movement of the parts in response to the application of external lateral thrusts on the ground engaging wheels other than the natural steering thrusts imparted to the wheels as a result of a change in the course of travel of the vehicle, a control device comprising a cylinder, a piston in the control cylinder, fluid connections respectively connecting the control cylinder at opposite sides of the piston therein to the suspension cylinders at the said one side of the pistons therein, and means operated by the stabilizing system in response to the reaction of external lateral thrusts applied to said relatively movable parts for relatively moving the control cylinder and piston therein.

4. In a vehicle comprising a supported assembly and a supporting assembly having tandemly arranged axles equipped with ground engaging wheels and supported for turning movement about substantially vertically extending axes located with respect to the axles to provide the latter with a caster effect, a first hydraulic suspension system for one side of the supported assembly, a second hydraulic suspension system for the other side of the supported assembly, each suspension system comprising a displacement device having a vertically extending cylinder connected to one of the assemblies and having a piston in the cylinder connected to the other of the assemblies, power means in each suspension system for respectively supplying fluid under pressure to the cylinders at one side of the pistons therein to support the supported assembly, a directional stabilizing system interconnecting the axles and having parts relatively movable to enable turning movement of the axles in the appropriate directions to allow said axles to conform to changes in the course of travel of the vehicle, said stabilizing system also having provision for resisting relative movement of the parts in either direction in response to the application of external lateral thrusts on the ground engaging wheels other than the natural steering thrusts imparted to the wheels as a result of a change in the course of travel of the vehicle, a control device comprising a cylinder, a piston in the control cylinder, fluid connections respectively connecting the control cylinder at opposite sides of the piston therein to the suspension cylinders at the said one side of the pistons therein, a double acting power cylinder and piston assembly connected to the piston in the control cylinder, and means operated by the stabilizing system in response to the reaction of the aforesaid external lateral thrusts applied to said relatively movable parts for alternately introducing fluid under pressure into and exhausting fluid under pressure from the power cylinder at opposite sides of the piston therein.

5. In a vehicle comprising a supported assembly and a supporting assembly having tandemly arranged axles equipped with ground engaging wheels and supported for turning movement about substantially vertically extending axes located with respect to the axles to provide a caster effect, suspension means at opposite sides of the supported assembly for supporting the latter on the supporting assembly, a closed hydraulic stabilizing system for the turning axles comprising double acting cylinders and pistons respectively supported within the cylinders, means for relatively moving the cylinders and pistons in response to the turning movement of the axles resulting from a change in the course of travel of the vehicle, a fluid connection between the cylinders at one side of the pistons, a second fluid connection between the cylinders at the opposite sides of the pistons therein, said fluid connections and cylinders being filled with a relatively non-compressible fluid, and means responsive to a difference in fluid pressure in opposite sides of the stabilizing system for raising one side of the supported assembly and correspondingly lowering the opposite side of said supported assembly.

6. The structure defined in claim 5 wherein the means responsive to a differential pressure in opposite sides of the stabilizing system comprises a double acting power cylinder having a piston slidably supported therein, valves responsive to an increase in pressure in one side of the stabilizing system for introducing fluid under pressure into the power cylinder at one side of the piston and for exhausting the power cylinder at the other side of the piston and responsive to an increase in pressure in the other side of the stabilizing system to introduce fluid under pressure into the power cylinder at the said other side of the piston and to exhaust the power cylinder at the one side aforesaid of the piston, and a connection between the piston in the power cylinder and the suspension means at opposite sides of the supported assembly.

7. The structure defined in claim 6 wherein the suspension means comprises vertically extending cylinders carried by one of the assemblies at opposite sides thereof and pistons respectively slidably supported in the cylinders and connected to the other of the assemblies, means for maintaining the space in the suspension cylinders at one side of the pistons filled with a relatively non-compressible fluid medium, and wherein the connection between the piston in the power cylinder and the suspension means comprises a control cylinder having a piston therein connected to the power cylinder piston, and fluid connections respectively connecting the control cylinder at opposite sides of the piston therein to the spaces provided in the suspension cylinders at opposite sides of said assemblies at the said one side of the pistons in the latter cylinders.

8. In a vehicle comprising a supported assembly and a supporting assembly having tandemly arranged axles equipped with ground engaging wheels and supported for turning movement about substantially vertically extending axes located with respect to the axles to provide a caster effect, a hydraulic suspension for the supported assembly comprising vertically extending cylinders carried by one of the assemblies at opposite sides of the vehicle, pistons connected to the other of the assemblies and respectively slidably supported in the cylinders to provide variable volume spaces in said cylinders at one side of the pistons, means for maintaining the variable volume spaces filled with a relatively non-compressible fluid medium, a closed hydraulic stabilizing system for the turning axles comprising double acting cylinders and pistons respectively supported within the cylinders, means for relatively moving the stabilizing cylinders and pistons therein in response to the turning movement of the axles resulting from a change in the course of travel of the vehicle, a fluid connection between the stabilizer cylinders at one side of the pistons in the latter cylinders, a second fluid connection between the stabilizer cylinders and the opposite sides of the pistons in the latter cylinders, said fluid connections and stabilizer cylinders being filled with a relatively non-compressible fluid, and means responsive to a differential pressure in opposite sides of the stabilizing system for introducing fluid under pressure into the variable volume spaces of the suspension cylinders at one side of the supported assembly and for withdrawing a corresponding volume of fluid from the variable volume spaces of the suspension cylinders at the opposite side of the supported assembly.

9. In a vehicle comprising a supported assembly and a supporting assembly having tandemly arranged axles equipped with ground engaging wheels and supported for turning movement about substantially vertically extending axes located with respect to the axles to provide a caster effect, a hydraulic suspension for the supported assembly comprising vertically extending cylinders carried by one of the assemblies at opposite sides of the vehicle, pistons connected to the other of the assemblies and respectively slidably supported in the cylinders to provide variable volume spaces in said cylinders at one side of the pistons, means for maintaining the variable volume spaces filled with a relatively non-compressible fluid medium, a closed hydraulic stabilizing system for the turning axles comprising double acting cylinders and pistons respectively supported within the cylinders, means for relatively moving the stabilizing cylinders and pistons therein in response to the turning movement of the axles resulting from a change in the course of travel of the vehicle, a fluid connection between the stabilizer cylinders at one side of the pistons in the latter cylinders, a second fluid connection between the stabilizer cylinders and the opposite sides of the pistons in the latter cylinders, said fluid connections and stabilizer cylinders being filled with a relatively non-compressible fluid, a control device comprising a cylinder, a piston in the control cylinder, fluid connections respectively connecting the control cylinder at opposite sides of the piston therein to the variable volume spaces of the suspension cylinders at opposite sides of the supported assembly, and means responsive to differential pressures at opposite sides of the stabilizing system for relatively moving the control cylinder and piston therein in opposite directions.

10. The structure defined in claim 9 wherein the means responsive to differential pressures in opposite sides of the stabilizing system comprises a power cylinder having a piston connected to the piston in the control cylinder, and valves respectively operated by differences in pressure in opposite sides of the stabilizing system for alternately connecting the power cylinder at opposite sides of the piston therein to a source of fluid under pressure and to an exhaust.

11. In a vehicle comprising a supported assembly and a supporting assembly having an axle equipped with ground engaging wheels, a cross member carried by the supported assembly and spaced forwardly from the axle, a first ring concentrically positioned with respect to a longitudinal centerline of the supported assembly and pivoted to the cross member for turning movement about a substantially vertical axis, a supporting part extending from the ring toward the axle and having laterally outwardly extending portions respectively slidably engaging opposite sides of the supported assembly, a second ring supported by the first ring in concentric relationship thereto and pivoted to the first ring for rotation about an axis perpendicular to the axis of turning movement of the axle, a third ring rotatably supported by the second ring in concentric relationship to the second ring, arms respectively connecting opposite sides of the third ring to opposite end portions of the axle, a hydraulic suspension for the supported assembly comprising vertically extending cylinders and pistons slidably supported in said cylinders, couplings respectively universally connecting the upper ends of the cylinders to the laterally outwardly extending portions of the supporting part, piston rods projecting downwardly from the pistons through the respective cylinders, couplings respectively universally connecting the lower ends of the piston rods to the arms, and means for maintaining the spaces in the cylinders above the pistons filled with a relatively non-compressible fluid.

12. In a vehicle comprising a supported assembly and a supporting assembly having an axle equipped with road engaging wheels and supported for turning movement about a substantially vertical axis spaced in advance of the axle in a position to provide a caster effect, a first hydraulic suspension system for one side of the supported assembly, a second hydraulic suspension system for the other side of the supported assembly, each system comprising a displacement device having a vertically extending cylinder connected to one of the assemblies and having a piston in said cylinder connected to the other of the assemblies, power means in each hydraulic suspension system for respectively supplying fluid under pressure to the cylinders at one side of the pistons therein to support the supported assembly, and means responsive to the application of external lateral thrusts on said road engaging wheels other than the natural steering thrusts imparted to the wheels as a result of a change in course of the vehicle for introducing fluid under pressure into one suspension cylinder at the said one side of the piston therein and for withdrawing a corresponding volume of fluid from the other suspension cylinder at the said one side of the piston therein.

13. In a vehicle comprising a supported assembly and a supporting assembly having an axle equipped with road engaging wheels and supported for turning movement about a substantially vertical axis spaced in advance of the axle in a position to provide a caster effect, a first hydraulic suspension system for one side of the supported assembly, a second hydraulic suspension system for the other side of the supported assembly, each suspension system comprising a displacement device having a vertically extending cylinder connected to one of the assemblies and having a piston in the cylinder connected to the other of the assemblies, power means in each system for respectively supplying fluid under pressure to the cylinders at one side of the pistons therein to support the supported assembly, a control device comprising a cylinder, a piston in said control cylinder, fluid connections respectively connecting the control cylinder at opposite sides of the piston therein to the suspension cylinders at the said one side of the pistons in the latter, and means responsive to the application of external lateral thrusts on said road engaging wheels other than the natural steering thrusts imparted to the wheels as a result of a change in course of the vehicle for relatively moving the control cylinder and piston in opposite directions.

14. In a vehicle comprising a supported assembly and a supporting assembly having tandemly arranged axles equipped with ground engaging wheels and supported for turning movement about substantially vertically extending axes located with respect to the axles to provide the latter with a caster effect, a first hydraulic suspension system for one side of the supported assembly, a second hydraulic suspension system for the other side of the supported assembly, each suspension system comprising a displacement device having a vertically extending cylinder connected to one of the assemblies and having a piston in the cylinder connected to the other of the assemblies, power means in each suspension system for respectively supplying fluid under pressure to the cylinders at one side of the pistons therein to support the supported assembly, a closed hydraulic stabilizing system for the turning axles comprising double acting cylinders and pistons respectively supported within the latter cylinders, means for relatively moving the stabilizing cylinders and pistons in response to turning movement of the axles resulting from a change in the course of travel of the vehicle, a fluid connection between the stabilizing cylinders at one side of the pistons therein, a second fluid connection between the stabilizing cylinders and the opposite sides of the pistons therein, said last named fluid connections and said stabilizing cylinder being filled with a relatively non-compressible fluid, and means responsive to differences in fluid pressure in opposite sides of the stabilizing system for alternately introducing fluid under pressure into and exhausing fluid from the suspension cylinders at the said one side of the pistons therein at a rate proportional to the difference in pressure existing at opposite sides of the stabilizing system.

15. In a vehicle comprising a supported assembly and a supporting assembly having tandemly arranged axles equipped with ground engaging wheels and supported for turning movement about substantially vertically extending axes located with respect to the axles to provide the latter with a caster effect, a first hydraulic suspension system for one side of the supported assembly, a second hydraulic suspension system for the other side of the supported assembly, each suspension system comprising a displacement device having a vertically extending cylinder connected to one of the assemblies and having a piston in the cylinder connected to the other of the assemblies, power means in each suspension system for respectively supplying fluid under pressure to the cylinders at one side of the pistons therein to support the supported assembly, a closed hydraulic stabilizing system for the turning axles comprising double acting cylinders and pistons respectively supported within the latter cylinders, means for relatively moving the stabilizing cylinders and pistons in response to turning movement of the axles resulting from a change in the course of travel of the vehicle, a fluid connection between the stabilizing cylinders at one side of the pistons therein, a second fluid connection between the stabilizing cylinders and the opposite sides of the pistons therein, said last named fluid connections and said stabilizing cylinder being filled with a relatively non-compressible fluid, a relatively movable control cylinder and piston assembly filled with a relatively non-compressible fluid, fluid connections between the spaces in the control cylinder at opposite sides of the piston therein and the suspension cylinders at the said one side of the pistons therein, fluid pressure operated means for relatively moving the control cylinder and piston therein in opposite directions to alternately raise and lower the opposite sides of the supported assembly including a pair of valves respectively connected to opposite sides of the stabilizing system for operation by differences in pressure in opposite sides of the stabilizing system, means opposing movement of said valves by differences in pressure at opposite sides of the stabilizing system, and means operated by relative movement of the control cylinder and piston therein for increasing the opposing force applied to said valves in proportion to the extent of relative movement of the control cylinder and piston therein.

16. In a vehicle comprising a supported assembly and a supporting assembly having tandemly arranged axles equipped with ground engaging wheels and supported for turning movement about substantially vertically extending axes located with respect to the axles to provide the latter with a caster effect, a first hydraulic suspension system for one side of the supported assembly, a second hydraulic suspension system for the other side of the supported assembly, each suspension system comprising a displacement device having a vertically extending cylinder connected to one of the assemblies and having a piston in the cylinder connected to the other of the assemblies, power means in each suspension system for respectively supplying fluid under pressure to the cylinders at one side of the pistons therein to support the supported assembly, a closed hydraulic stabilizing system for the turning axles comprising double acting cylinders and pistons respectively supported within the latter cylinders, means for relatively moving the stabilizing cylinders and pistons in response to turning movement of the axles resulting from a change in the course of travel of the vehicle, a fluid connection between the stabilizing cylinders at one side of the pistons therein, a second fluid connection between the stabilizing cylinders and the opposite sides of the pistons therein, said last named fluid connections and said stabilizing cylinder being filled with a relatively non-compressible fluid, a relatively movable control cylinder and piston assembly filled with a relatively non-compressible fluid, fluid connections between the spaces in the control cylinder at opposite sides of the piston therein and the suspension cylinders at the said one side of the pistons therein, fluid pressure operated means for relatively moving the control cylinder and piston therein in opposite directions to alternately raise and lower the opposite sides of the supported assembly including a relatively movable power cylinder and piston assembly connected to the control assembly for relatively moving the control cylinder and piston therein, valves operated by an increase in pressure in one side of the stabilizing system for introducing fluid under pressure into the power cylinder at one side of the piston therein and for exhausting the power cylinder at the other side of the piston therein and operated by an increase in pressure in the opposite side of the stabilizing system for introducing fluid under pressure into the power cylinder at the said other side of the piston and to exhaust the power cylinder at the one side aforesaid of the piston, means opposing movement of both valves by differences in pressure at opposite sides of the stabilizing system, and means responsive to relative movement of the control cylinder and piston therein for increasing the opposing force exerted on said valves as the extent of relative movement of the control cylinder and piston therein increases.

17. In a vehicle comprising a supported assembly and a supporting assembly having tandemly arranged axles equipped with ground engaging wheels and supported for turning movement about substantially vertically extending axes located with respect to the axles to provide a caster effect, suspension means at opposite sides of the supported assembly for supporting the latter on the supporting assembly, a closed hydraulic stabilizing system for the turning axles comprising double acting cylinders and pistons respectively supported within the cylinders, means for relatively moving the cylinders and pistons in response to the turning movement of the axles resulting from a change in the course of travel of the vehicle, a fluid connection between the cylinders at one side of the pistons, a second fluid connection between the cylinders at the opposite sides of the pistons therein, said fluid connections and cylinders being filled with a relatively non-compressible fluid, and means responsive to a difference in fluid pressure in opposite sides of the stabilizing system for raising one side of the supported assembly and correspondingly lowering the opposite side of said supported assembly, said last-named means comprising a double acting power cylinder having a piston slidably supported therein, valve means responsive to an increase in pressure in one side of the stabilizing system for introducing fluid under pressure into the power cylinder at one side of the piston and for exhausting the power cylinder at the other side of the piston and responsive to an increase in pressure in the other side of the stabilizing system to introduce fluid under pressure into the power cylinder at the said other side of the piston and to exhaust the power cylinder at the one side aforesaid of the piston, and a connection between the piston in the power cylinder and the suspension means at opposite sides of the supported assembly.

18. Structure as defined in claim 17 including means opposing movement of said valve means by differences in pressure at opposite sides of the stabilizing system, and means responsive to relative movement of said power cylinder and piston therein for increasing the opposing force applied to said valve means as the extent of relative movement of said power cylinder and piston thus increases.

19. In a vehicle comprising a supported assembly and a supporting assembly having tandemly arranged axles equipped with ground engaging wheels and supported for turning movement about substantially vertically extending axes located to provide the axles with a caster effect, a suspension system for supporting the supported assembly on the supporting assembly, a directional stabilizing system interconnecting the axles and having parts relatively movable to enable turning movement of the axles in the appropriate directions to allow said axles to conform to changes in the course of travel of the vehicle, said stabilizing system also having provision for resisting relative movement of said parts in response to the application of external lateral thrusts on the ground engaging wheels other than the natural steering thrusts imparted to the wheels as a result of a change in the course of travel of the vehicle, and means operated by the stabilizing system in response to the reaction of the aforesaid lateral thrusts imparted to said relatively movable parts for raising one side of the supported assembly and correspondingly lowering the other side of said supported assembly, said last-named means including a double acting power cylinder having a piston slidably supported therein, valve means responsive to the reaction of said relatively movable parts to lateral thrusts in one direction for introducing fluid under pressure into said power cylinder at one side of the piston therein and for exhausting the power cylinder at the other side of said piston and responsive to the reaction of said laterally movable parts to lateral thrusts in the opposite direction for introducing fluid under pressure into said power cylinder at the said other side of said piston and for exhausting the power cylinder at the said one side of said piston, and a connection between said piston and said suspension means at opposite sides of the supported assembly.

20. Structure as defined in claim 19 including means opposing movement of said valve means in response to the reaction of said relatively movable parts to lateral thrusts, and means responsive to relative movement of the power cylinder and piston therein for increasing the opposing force exerted on said valve means as the extent of relative movement of the power cylinder and piston therein increases.

21. In a vehicle comprising a supported assembly and a supporting assembly having an axle equipped with road engaging wheels and supported for turning movement about a substantially vertical axis spaced in advance of the axle in a position to provide a caster effect, a first hydraulic suspension system for one side of the supported assembly, a second hydraulic suspension system for the other side of the supported assembly, each suspension system comprising a displacement device having a vertically extending cylinder connected to one of the assemblies and having a piston in the cylinder connected to the other of the assemblies, power means in each system for respectively supplying fluid under pressure to the cylinders at one side of the pistons therein to support the supported assembly, a control device comprising a cylinder, a piston in said control cylinder, fluid connections respectively connecting the control cylinder at opposite sides of the piston therein to the suspension cylinders at the said one side of the pistons in the latter, and means responsive to the application of external lateral thrusts on said road engaging wheels other than the natural steering thrusts imparted to the wheels as a result of a change in course of the vehicle for relatively moving the control cylinder and piston in opposite directions, said last-named means including a power cylinder having a piston therein, valve means responsive to the application of external lateral thrusts in one direction on said road engaging wheels for introducing fluid under pressure to said power cylinder at one side of the piston therein and for exhausting the power cylinder at the other side of the piston and responsive to the application of external lateral thrusts in the opposite direction for introducing fluid under pressure to said power cylinder at said other side of the piston therein and exhausting said power cylinder at said one side of the piston therein, and means connecting the piston in said power cylinder to the piston in said control cylinder.

22. Structure as defined in claim 21 including means opposing movement of said valve means in response to the application of said lateral thrusts upon said wheels, and means responsive to relative movement of the power cylinder and piston therein for increasing the opposing force exerted on said valve means as the extent of relative movement of the power cylinder and piston therein increases.

23. In a vehicle comprising a supported assembly and a supporting assembly having tandemly arranged axles equipped with ground engaging wheels and supported for turning movement about substantially vertically extending axes located with respect to the axles to provide the latter with a caster effect, a first hydraulic suspension system for one side of the supported assembly, a second hydraulic suspension system for the other side of the supported assembly, each suspension system comprising a displacement device having a vertically extending cylinder connected to one of the assemblies and having a piston in the cylinder connected to the other of the assemblies, said cylinders being filled with a non-compressible fluid medium at one side of the pistons therein to support the supported assembly, a directional stabilizing system interconnecting the axles and having parts relatively movable to enable turning movement of the axles in the appropriate directions to allow said axles to conform to changes in the course of travel of the vehicle, said stabilizing system also having provision for resisting relative movement of the parts in response to the application of external lateral thrusts on the ground engaging wheels other than the natural steering thrusts imparted to the wheels as a result of a change in the course of travel of the vehicle, and means operated by the stabilizing system in response to the reaction of external lateral thrusts applied to said parts for introducing fluid into one cylinder at said one side of the piston therein and for withdrawing a corresponding volume of fluid from the other cylinder at said one side of the piston therein.

24. In a vehicle comprising a supported assembly and a supporting assembly having an axle equipped with road engaging wheels, a first hydraulic suspension system for one side of the supported assembly, a second hydraulic suspension system for the other side of the supported assembly, each system comprising a displacement device having a vertically extending cylinder connected to one of the assemblies and having a piston in said cylinder connected to the other of the assemblies, said cylinders being filled with a relatively non-compressible fluid medium at one side of the pistons therein to support the supported assembly, and means responsive to the application of external lateral thrusts on said road engaging wheels other than the natural steering thrusts imparted to the wheels as a result of a change in course of the vehicle for introducing fluid under pressure into one suspension cylinder at the said one side of the piston therein and for withdrawing a corresponding volume of fluid from the other suspension cylinder at the said one side of the piston therein.

References Cited in the file of this patent

UNITED STATES PATENTS

| | | |
|---|---|---|
| 2,139,178 | Stevens | Dec. 6, 1938 |
| 2,249,212 | Kolbe | July 15, 1941 |
| 2,280,044 | Kolbe | Apr. 14, 1942 |
| 2,474,471 | Dolan | June 28, 1949 |
| 2,643,895 | Stover | June 30, 1953 |

FOREIGN PATENTS

| | | |
|---|---|---|
| 487,786 | Great Britain | June 23, 1938 |
| 518,848 | Great Britain | Mar. 8, 1940 |